US012785285B2

(12) United States Patent
Zhang et al.

(10) Patent No.: US 12,785,285 B2
(45) Date of Patent: Nov. 3, 2026

(54) BASE STATION ANTENNAS WITH EXTERNAL PIM SHIELDING STRUCTURES AND RELATED DEVICES

(71) Applicant: Outdoor Wireless Networks LLC, Claremont, NC (US)

(72) Inventors: Xun Zhang, Suzhou (CN); YueMin Li, Suzhou (CN); Nengbin Liu, Suzhou (CN); Peter J. Bisiules, LaGrange Park, IL (US); Yutong Liu, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 168 days.

(21) Appl. No.: 18/707,750

(22) PCT Filed: Dec. 31, 2021

(86) PCT No.: PCT/CN2021/143656

§ 371 (c)(1),
(2) Date: May 6, 2024

(87) PCT Pub. No.: WO2023/123342

PCT Pub. Date: Jul. 6, 2023

(65) Prior Publication Data

US 2026/0163244 A1 Jun. 11, 2026

(51) Int. Cl.

| | |
|---|---|
| ***H01Q 15/00*** | (2006.01) |
| ***H01Q 1/24*** | (2006.01) |
| ***H01Q 1/52*** | (2006.01) |

(52) U.S. Cl.

CPC ......... *H01Q 15/0013* (2013.01); *H01Q 1/246* (2013.01); *H01Q 1/526* (2013.01)

(58) Field of Classification Search

CPC ..... H01Q 1/246; H01Q 1/526; H01Q 15/0013

See application file for complete search history.

(56) References Cited

U.S. PATENT DOCUMENTS

| | | | |
|---|---|---|---|
| 7,907,096 | B2 | 3/2011 | Timofeev et al. |
| 9,692,115 | B2 | 6/2017 | Rucki et al. |
| 10,601,120 | B2 | 3/2020 | Bisiules et al. |
| 10,978,840 | B2 | 4/2021 | Paynter et al. |
| 11,552,408 | B2 | 1/2023 | Tang et al. |
| 11,581,631 | B2 | 2/2023 | Li et al. |

(Continued)

FOREIGN PATENT DOCUMENTS

| | | |
|---|---|---|
| CN | 210723313 U | 6/2020 |
| CN | 216362158 U | 4/2022 |

(Continued)

OTHER PUBLICATIONS

Ben A. Munk, Frequency Selective Surfaces: Theory and Design, ISBN: 978-0-471-37047-5; DOI: 10.1002/0471723770; Apr. 2000, Copyright @ 2000 John Wiley & Sons, Inc.

(Continued)

*Primary Examiner* — Hoang V Nguyen
(74) *Attorney, Agent, or Firm* — Myers Bigel, P.A.

(57) ABSTRACT

Base station antennas include an external PIM shielding structure with a frequency selective surface and an array of low band radiating elements projecting forward of the FSS. A mMIMO antenna array resides behind the FSS and is configured to transmit signal through the FSS and out a front radome of the base station antenna.

21 Claims, 14 Drawing Sheets

(56) References Cited

U.S. PATENT DOCUMENTS

| | | | |
|---|---|---|---|
| 11,658,372 | B2 | 5/2023 | Kosaka |
| 2001/0046258 | A1 | 11/2001 | Wise et al. |
| 2010/0013729 | A1 | 1/2010 | Harel et al. |
| 2010/0214190 | A1 | 8/2010 | Shin et al. |
| 2013/0221182 | A1 | 8/2013 | Renilson et al. |
| 2014/0179244 | A1 | 6/2014 | Colapietro et al. |
| 2014/0313095 | A1 | 10/2014 | Pu et al. |
| 2015/0091777 | A1 | 4/2015 | Rucki et al. |
| 2016/0043515 | A1 | 2/2016 | Colapietro et al. |
| 2016/0365618 | A1 | 12/2016 | Kim et al. |
| 2017/0222313 | A1 | 8/2017 | Markof et al. |
| 2018/0323503 | A1 | 11/2018 | Bouchard |
| 2018/0337443 | A1 | 11/2018 | Bisiules et al. |
| 2019/0312339 | A1 | 10/2019 | Fritze et al. |
| 2020/0185827 | A1 | 6/2020 | Kaistha et al. |
| 2020/0259248 | A1 | 8/2020 | Lv et al. |
| 2021/0057796 | A1 | 2/2021 | Xu et al. |
| 2021/0066779 | A1 | 3/2021 | Udagave |
| 2021/0129276 | A1 | 5/2021 | Zhu et al. |
| 2021/0160705 | A1 | 5/2021 | Zimmerman et al. |
| 2021/0175598 | A1 | 6/2021 | Dembinski et al. |
| 2021/0194109 | A1 | 6/2021 | Shao et al. |
| 2021/0195687 | A1 | 6/2021 | Patel et al. |
| 2021/0218156 | A1 | 7/2021 | Patel et al. |
| 2021/0242599 | A1 | 8/2021 | Deng et al. |
| 2021/0305683 | A1 | 9/2021 | Hou et al. |
| 2021/0305684 | A1* | 9/2021 | Hou ........................ H01Q 1/246 |
| 2021/0305717 | A1 | 9/2021 | Hou et al. |
| 2021/0321486 | A1 | 10/2021 | Mirza et al. |
| 2021/0336331 | A1 | 10/2021 | Rai et al. |
| 2021/0384616 | A1 | 12/2021 | Patel et al. |
| 2021/0384641 | A1 | 12/2021 | Tang et al. |
| 2022/0085481 | A1 | 3/2022 | Severin et al. |
| 2022/0094051 | A1 | 3/2022 | Ameer P et al. |
| 2022/0393339 | A1 | 12/2022 | Soni |
| 2022/0407240 | A1 | 12/2022 | Bisiules et al. |
| 2023/0098188 | A1 | 3/2023 | Li et al. |
| 2023/0208051 | A1 | 6/2023 | Zhang et al. |
| 2023/0291099 | A1 | 9/2023 | Pu et al. |
| 2024/0113419 | A1 | 4/2024 | Li et al. |
| 2024/0150619 | A1 | 5/2024 | Delforce et al. |

FOREIGN PATENT DOCUMENTS

| | | | |
|---|---|---|---|
| CN | 115483543 | A | 12/2022 |
| CN | 116154451 | A | 5/2023 |
| WO | 2015095779 | A1 | 6/2015 |
| WO | 2016115240 | A1 | 7/2016 |
| WO | 2019236203 | A2 | 12/2019 |
| WO | 2020072880 | A1 | 4/2020 |
| WO | 2020086303 | A1 | 4/2020 |
| WO | 2021141430 | A1 | 7/2021 |
| WO | 2021195040 | A2 | 9/2021 |
| WO | 2021195040 | A3 | 11/2021 |
| WO | 2022111408 | A1 | 6/2022 |
| WO | 2022265904 | A1 | 12/2022 |
| WO | 2023044604 | A1 | 3/2023 |

OTHER PUBLICATIONS

International Search Report and the Written Opinion of the International Searching Authority corresponding to International Patent Application No. PCT/CN2021/143656 (12 pages) (mailed Jun. 23, 2022).

* cited by examiner

BASE STATION ANTENNAS WITH EXTERNAL PIM SHIELDING STRUCTURES AND RELATED DEVICES

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each cell is divided into "sectors." In one common configuration, a hexagonally shaped cell is divided into three 120° sectors in the azimuth plane, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In order to accommodate the increasing volume of cellular communications, cellular operators have added cellular service in a variety of new frequency bands. In order to increase capacity without further increasing the number of base station antennas, multi-band base station antennas have been introduced which include multiple linear arrays of radiating elements. Additionally, base station antennas are now being deployed that include "beamforming" arrays of radiating elements that include multiple columns of radiating elements that are connected to respective ports of a radio so that the antenna may perform active beamforming (i.e., the shapes of the antenna beams generated by the antenna may be adaptively changed to improve the performance of the antenna). In some cases, the radios for these beamforming arrays may be integrated into the antenna. These beamforming arrays typically operate in higher frequency bands, such as various portions of the 3.3-5.8 GHz frequency band. Antennas having integrated radios that can adjust the amplitude and/or phase of the sub-components of an RF signal that are transmitted through individual radiating elements or small groups thereof are referred to as "active antennas." Active antennas can generate narrowed beamwidth, high gain, antenna beams and can steer the generated antenna beams in different directions by changing the amplitudes and/or phases of the sub-components of RF signals that are transmitted through the antenna.

Further details of example conventional antennas can be found in co-pending WO2019/236203 and WO2020/072880, the contents of which are hereby incorporated by reference as if recited in full herein.

Passive inter-modulation distortion ("PIM") is a form of electrical interference that may occur when two or more RF signals encounter non-linear electrical junctions or materials along an RF transmission path. Such non-linearities may act like a mixer causing the RF signals to generate new RF signals at mathematical combinations of the original RF signals. These newly generated RF signals are referred to as "inter-modulation products." If RF signals transmitted through a device generate inter-modulation products that fall in the same bandwidth of RF signals that are received through the same device, the inter-modulation products effectively increase the noise level experienced by the existing RF signals in the receiver bandwidth. When the noise level is increased, it may be necessary to reduce the data rate and/or the quality of service. PIM can be an important interconnection quality characteristic, as PIM generated by a single low-quality interconnection may degrade the electrical performance of the entire RF communications system. Thus, ensuring that components used in RF communications systems will generate acceptably low levels of PIM may be desirable.

The above-described inter-modulation products arise because non-linear systems generate harmonics in response to sinusoidal inputs. For example, when a signal having a first frequency Sn is input to a non-linear system, then the resulting output signal will include signals at integer multiples of the input frequency. When two or more signals having different frequencies are input to a non-linear system, inter-modulation products arise. For example, consider a composite input signal x(t) to a non-linear system that includes signals at three different frequencies:

$$x(t) = A_1\sin(2\pi f_1 t + \varphi_1) + A_2\sin(2\pi f_2 t + \varphi_2) + A_3\sin(2\pi f_3 t + \varphi_3) \quad \text{EQN (1)}$$

In Equation (1) above, $A_i$ and $\varphi_i$ are the amplitudes and phases of the signals at the three different frequencies $f_1$, $f_2$, $f_3$. If these signals are passed through a non-linearity, the resulting output signal will include components at the frequencies $f_1$, $f_2$, $f_3$ of the three input signals, which are referred to as the fundamental components, as well as linear combinations of these fundamental components having the form:

$$k1f1 + k2f2 + k3f3 \quad \text{EQN (2)}$$

where $k_1$, $k_2$, $k_3$ are arbitrary integers which can have positive or negative values. These components are the inter-modulation products and harmonics and will have amplitudes and phases that are a function of the non-linearity and the composite input signal x(t).

The order of an inter-modulation product is the sum of the absolute value of the coefficients $k_i$ included in the inter-modulation product. In the above example where the composite input signal x(t) includes signals at three different frequencies, the third order inter-modulation products are the inter-modulation products where:

$$|k1| + |k2| + |k3| = 3, \quad \text{where } |k1|, |k2|, |k3| < 3 \quad \text{EQN (3)}$$

In the above example, the third-order inter-modulation products will be at the following frequencies:

$$f_1 + f_2 - f_3$$

$$f_1 + f_3 - f_2$$

$$f_2 + f_3 - f_1$$

$$2f_1 - f_2$$

-continued $$2f_1 - f_3$$
$$2f_2 - f_1$$
$$2f_2 - f_3$$
$$2f_3 - f_1$$
$$2f_3 - f_2$$

The odd-order inter-modulation products are typically of the most interest as these products are the ones that tend to fall in the vicinity of the frequencies of the fundamental components.

PIM may be caused by, for example, inconsistent metal-to-metal contacts along an RF transmission path, particularly when such inconsistent contacts are in high current density regions of the transmission path such as inside RF transmission lines, inside RF components, or on current carrying surfaces of an antenna. Such inconsistent metal-to-metal contacts may occur, for example, because of contaminated and/or oxidized signal carrying surfaces, loose connections between two connectors, metal flakes or shavings inside RF components or connections and/or poorly prepared soldered connections (e.g., a poor solder termination of a coaxial cable onto a printed circuit board). PIM may arise in a variety of different components of an RF communications system. For example, non-linearities may exist at the interconnections in an RF communications system where cables such as coaxial cables are connected to each other or to RF equipment. PIM may also arise in other components of an RF communications system such as radios, RF amplifiers, duplexers, cross-band couplers, interference mitigation filters and the like. PIM may also arise on or within radiating elements of the RF communications system such as parabolic antennas or phased array antenna elements. The non-linearities that give rise to PIM may be introduced at the time of manufacture, during installation, or due to electro-mechanical shift over time due to, for example, mechanical stress, vibration, thermal cycling, and/or material degradation.

SUMMARY

Embodiments of the present invention are directed to base station antennas with an external PIM shielding structure.

The external PIM shielding structure can be provided with rearwardly extending right and left side walls and a front surface extending therebetween. The front surface can comprise a frequency selective surface (FSS).

The FSS can be configured to allow high band radiating elements to propagate electromagnetic waves therethrough and reflect lower band RF signals transmitted by lower band radiating elements projecting forward of the FSS.

The FSS can be provided, for example, by a printed circuit board defining a metal grid pattern, a sheet of metal provided with a grid pattern or a plastic substrate with a metallized grid.

Where used, the grid pattern provided by the sheet of metal can be provided with an array of apertures devoid of metal or with metal patches that are configured to allow high band radiating elements to propagate electromagnetic waves through the apertures and reflect lower band RF signals transmitted by lower band radiating elements projecting forward of the FSS.

Embodiments of the present invention are directed to a base station antenna that includes: a base station antenna housing with a front radome and a rear; a passive antenna assembly in the base station housing having plurality of linear arrays of radiating elements that extend in front of a reflector; and a passive inter-modulation distortion ("PIM") shielding structure that is at least partly positioned rearward of the base station antenna housing. The PIM shielding structure includes a frequency selective surface (FSS).

The FSS can be configured to reflect or block electromagnetic waves from radiating elements of the passive antenna assembly and allow higher band electromagnetic waves to travel therethrough toward the front radome.

The FSS can be external to the base station antenna housing.

The PIM shielding structure can have a longitudinally and laterally extending front that can provide the FSS and can have right and left side walls that extend rearwardly behind the rear of the base station antenna housing.

The base station antenna can further include an active antenna module coupled to the base station antenna housing with the FSS of the PIM shielding structure therebetween.

The FSS can be defined by at least one sheet of metal arranged to provide a grid pattern.

The FSS can have a grid pattern.

The FSS can extend across at least 50% of a lateral extent of the base station housing and can extend along a sub-length of the PIM shielding structure.

The right and left side walls can have a width measured in a front to back direction that is greater than a width of side walls of the base station antenna housing.

A front of the PIM shielding structure can have an open space between the right and left side walls beneath the FSS.

The PIM shielding structure can be coupled to or can define a frame coupled to the rear of the base station antenna.

The base station antenna can be provided with an active antenna module coupled to the base station antenna housing. The active antenna module can have an array of radiating elements facing the FSS. The array of radiating elements of the active antenna module can be configured to propagate RF energy through the FSS.

The array of radiating elements of the active antenna module can be provided as a mMIMO array of radiating elements positioned behind the FSS.

The FSS can have a lateral extent that is a sub-distance of a lateral extent of the housing of the base station antenna and can reside at an upper portion of the base station antenna housing, aligned with the array of adiating elements of the active antenna module.

The FSS can be configured to allow RF energy to pass through at one or more defined frequency range and reflect RF energy at a different frequency band.

The FSS can be configured to reflect RF energy at a low band and pass RF energy at a higher band.

The plurality of linear arrays can include low band dipole antennas.

The active antenna module comprises a radome, and wherein the radome of the active antenna module resides adjacent to and faces the rear of the base station antenna housing with the FSS of the PIM shielding structure therebetween.

Yet other embodiments are directed to a base station antenna assembly that includes: a plurality of columns of first radiating elements configured for operating in a first operational frequency band inside a base station antenna housing, each column of first radiating elements comprising a plurality of first radiating elements arranged in a longitudinal direction; and an external PIM shielding structure coupled to the base station antenna housing with right and left side walls extending rearwardly from the base station antenna housing and with a frequency selective surface (FSS) between the right and left side walls positioned with the FSS behind the plurality of columns of first radiating elements. The FSS is configured to reflect electromagnetic waves within the first operational frequency band.

The base station antenna assembly can further include a plurality of columns of second radiating elements configured for operating in a second operational frequency band that is different from and does not overlap with the first operational frequency band, each column of second radiating elements comprising a plurality of second radiating elements arranged in the longitudinal direction. The FSS is further configured such that electromagnetic waves within the second operational frequency band can propagate through the FSS.

The second operational frequency band can be higher than the first operational frequency band. The plurality of columns of second radiating elements can be provided by an active antenna module coupled to a rear of the base station antenna housing.

The FSS can be defined by a sheet of metal configured with an array of unit cells.

The unit cells can have open center spaces devoid of metal that are surrounded by a perimeter of metal.

Still other aspects are directed to a PIM shielding structure for a base station antenna that includes a sheet metal body comprising a front that has a longitudinal extent and a lateral extent. The front has a first region with a grid pattern comprising an array of unit cells defining a frequency selective surface. The first region merges into a second region that is an open or closed longitudinally and laterally extending space. The sheet metal body can have side walls that extend perpendicularly rearward of the front.

The sheet metal body can be a unitary, monolithic body.

The PIM shielding structure can have a dielectric cover attached to and residing in front and/or behind the front and extending over at least a majority of the grid pattern of unit cells.

The PIM shielding structure can have a frame coupled to the sheet metal body. The frame can have a top bracket with a plurality of laterally spaced apart slots.

DETAILED DESCRIPTION

Embodiments of the present invention are directed to base station antennas. In the description that follows, these base station antennas will be described using terms that assume that the base station antenna is mounted for use on a tower, pole or other mounting structure 10 (FIGS. 3, 8A) with the longitudinal axis L (FIG. 8A) of the base station antenna extending along a vertical axis and the front of the base station antenna mounted opposite the tower, pole or other mounting structure pointing toward the target coverage area for the base station antenna. It will be appreciated that the base station antennas may not always be mounted so that the longitudinal axes thereof extend along a vertical axis. For example, the base station antennas may be tilted slightly (e.g., less than 10°) with respect to the vertical axis so that the resultant antenna beams formed by the base station antennas each have a small mechanical downtilt.

Figure 1:
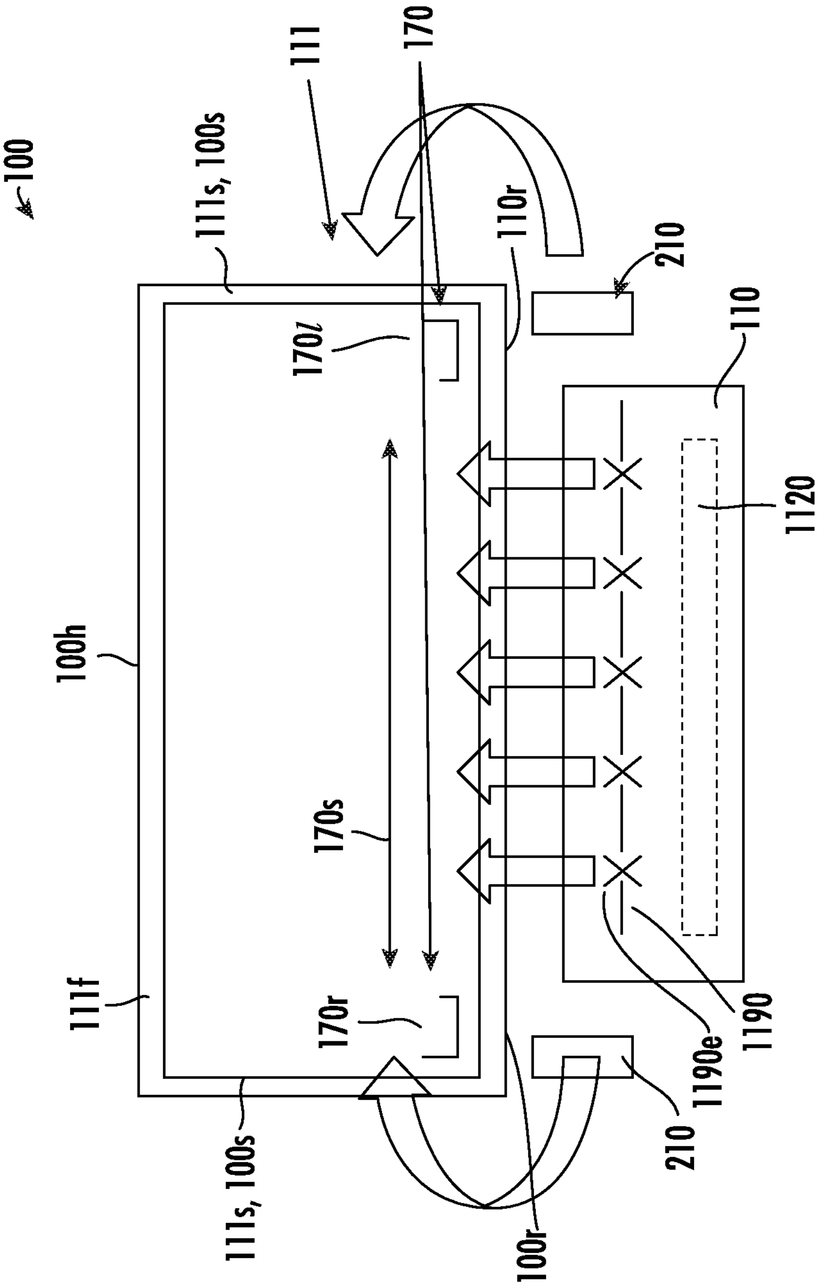
FIG. 1 PRIOR ART
FIG. 1 is a simplified cross-section view of a prior art base station antenna.

FIG. 1 illustrates a base station antenna 100. The base station antenna 100 can couple to or include at least one active antenna module 110. The term "active antenna module" is used interchangeably with "active antenna unit" and "AAU" and refers to a cellular communications unit comprising radio circuitry and associated radiating elements. The radio circuitry is capable of electronically adjusting the amplitude and/or phase of the subcomponents of an RF signal that are output to different radiating elements of an array of radiating elements or groups thereof. The active antenna module 110 may include both the radio circuitry and a radiating element array (e.g., a multi-input-multi-output (mMIMO) beamforming antenna array) and may include other components such as filters, a calibration network, an antenna interface signal group (AISG) controller and the like. The active antenna module 110 can be provided as a single integrated unit or provided as a plurality of stackable units, including, for example, first and second sub-units such as a radio sub-unit (box) with the radio circuitry and an antenna sub-unit (box) with a multi-column array of radiating elements and the first and second sub-units stackably attach together in a front to back direction of the base station antenna 100, with the radiating element array 1190 closer to the front 111*f* of the housing 100*h*/radome 111 of base station antenna 100 than the radio circuitry unit 1120. The rear surface 100*r* of the base station antenna housing 100*h* can have a pair of rails 210 that can be used to mount the active antenna module 110 thereto. As shown, the rails 210 can be longitudinally extending rails but laterally extending rails or combinations of laterally extending and longitudinally extending rails may be provided, where such rails are used.

As will be discussed further below, the base station antenna 100 includes an antenna assembly 190 (FIG. 9) inside the housing 100*h*, which can be referred to as a "passive antenna assembly". The term "passive antenna assembly" refers to an antenna assembly having one or more arrays of radiating elements that are coupled to radios that are external to the antenna assembly, typically remote radio heads that are mounted in close proximity to the base station antenna housing 100*h*. The arrays of radiating elements included in the passive antenna assembly 190 (FIG. 9) are configured to form static antenna beams (e.g., antenna beams that are each configured to cover a sector of a base station). The passive antenna assembly 190 may comprise a reflector 170, with radiating elements projecting in front of the reflector and the radiating elements can include one or more linear arrays of low band radiating elements that operate in all or part of the 617-960 MHz frequency band and/or one or more linear arrays of mid-band radiating elements that operate in all or part of the 1427-2690 MHz frequency band. The passive antenna assembly 190 (FIG. 9) is mounted in the housing 100*h* of base station antenna 100 and one or more active antenna modules 110 can releasably (detachably) couple (e.g., directly or indirectly attach) to base station antenna 100.

The base station antenna 100 has a housing 100*h*. The housing 100*h* may be substantially rectangular with a flat rectangular cross-section. At least a front side of the housing 100*h* may be implemented as include a radome 111. A radome refers to a dielectric cover that allows RF energy to pass through in certain frequency bands. A rear 100*r* of the housing 100*h* may also include a rear side 111*r* radome that is opposite the front side radome 111*f*. Optionally, the housing 100*h* and/or the radome 111 can also comprise two (narrow) sidewalls 100*s*, 111*s* facing each other and extending rearwardly between the front side 111*f* and the rear side 111*r*. The sidewalls 100*s*, 111*s* can have a width, measured in a front-to-back direction, that is 40%-90% less than a lateral extent of the housing 100*h*.

Figure 8A:
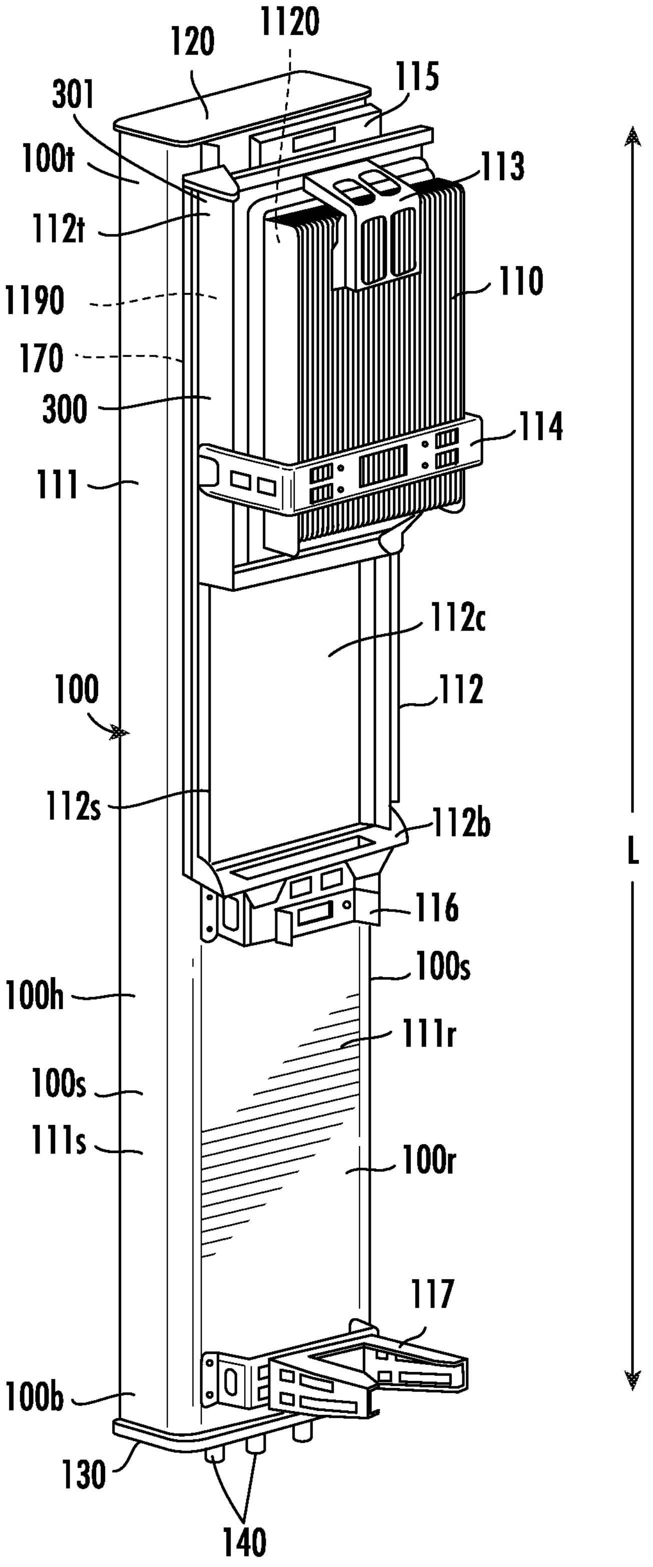
FIG. 8A is a rear perspective view of a base station antenna and active antenna module with a PIM shielding structure therebetween according to embodiments of the present invention.

Referring to FIG. 8A, typically, the top side 100*t* of the housing 100*h* may be sealed in a waterproof manner and may comprise an end cap 120 and the bottom side 100*b* of the housing 100*h* may be sealed with a separate end cap 130 with RF ports 140. The front side, at least part of the sidewalls and typically at least part of the rear side of the housing are typically implemented as radomes that are substantially transparent to RF energy within the operating frequency bands of the base station antenna 100 and active antenna module 110. The radome 111 may be formed of, for example, fiberglass or plastic.

As shown by the arrows in FIG. 1, radiation transmitted by the array of radiating elements in the active antenna 1190 can enter the housing 100*h* from both the back 100*r* and from the sides 100*s*, 111*s*. A reflector 170 in the housing 100*h* can have a portion with longitudinally extending right and left segments 170*r*, 170/(right and left directions are based on directions when looking from a front 100*f* of the base station antenna 100) separated by an open laterally and longitudinally extending segment 170*s* in front of radiating elements 1190*e* of the active antenna 1190.

PIM signals can be generated in the active antenna module 110. For example, multiple of the RF energy emitted by arrays of the passive antenna assembly can travel rearwardly through the opening 170*s* in the reflector 170. These RF signals can mix with each other and/or with RF signals emitted by the array of radiating elements in the active antenna module 110. If the mixed RF signals encounter inconsistent metal-to-metal connections in the active antenna module (or other PIM generating structures) then PIM signals will be generated. These PIM signals (radiation) can travel forwardly into the passive antenna assembly through the opening 170*s* in the reflector 170, and/or may curl around and enter the passive antenna assembly through the sidewalls of the housing.

Active antenna modules are often configured to operate using time division duplexing multiple access schemes in which the transmit and receive signals do not overlap in time, but instead the active antenna module transmits RF signals during selected time slots and receives RF signals during other time slots. As a result, the amount of PIM that can be tolerated by an active antenna modules may be much higher than the PIM levels that are acceptable for passive antenna assemblies that operate under frequency division duplexing (FDD) multiple access schemes. In such FDD systems, the PIM signal(s) can be as large as signals being received by the low band and/or mid band radiating elements.

Figure 2:
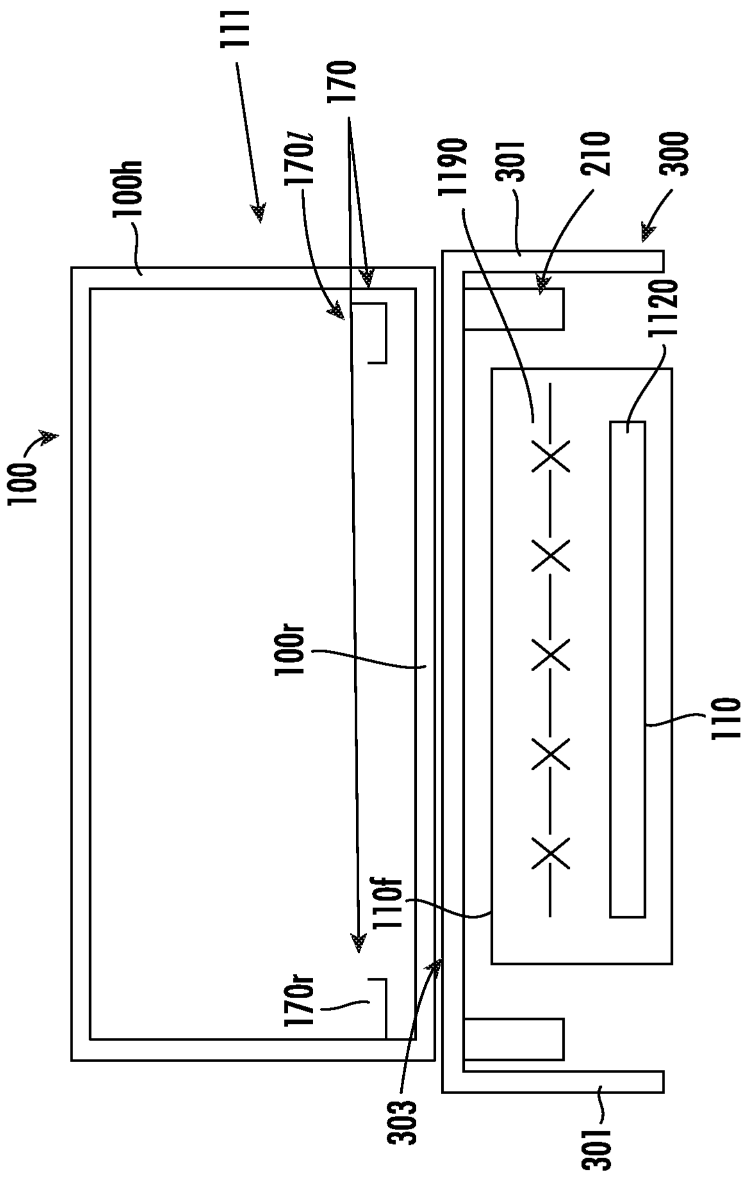
FIG. 2 is a simplified cross-section view of a base station antenna with a PIM shielding structure according to embodiments of the present invention.
Figure 3:
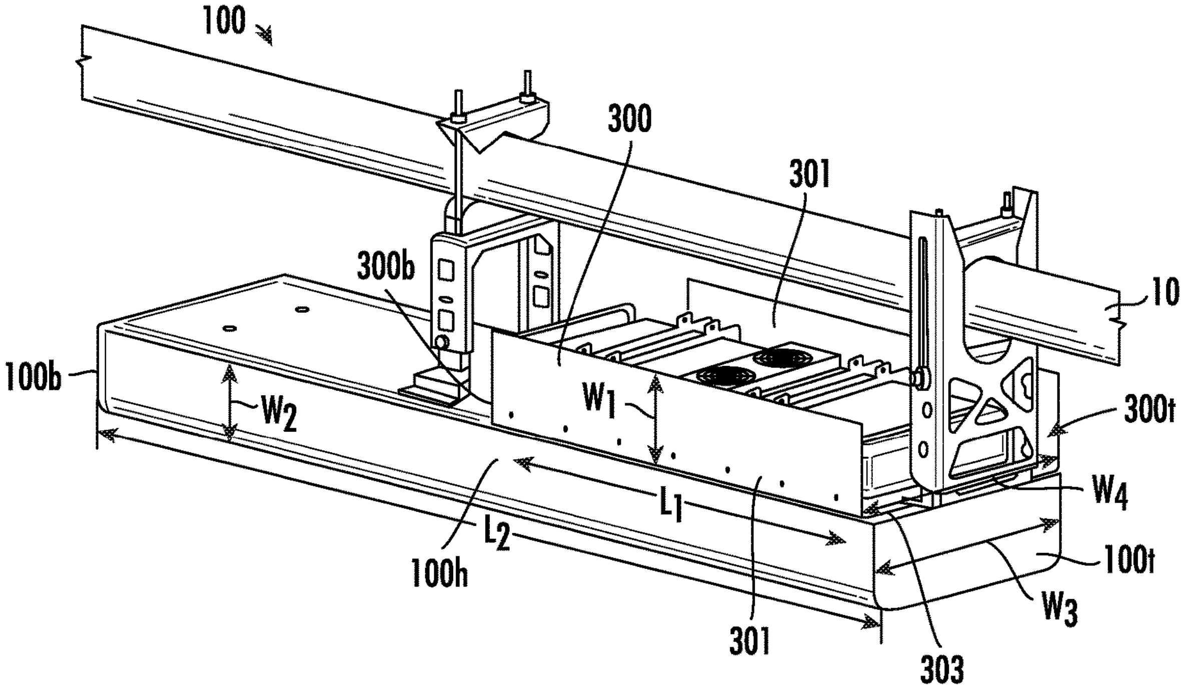
FIG. 3 is a back, side perspective view of an example base station antenna coupled to an active antenna module with an example PIM shielding structure therebetween according to embodiments of the present invention.
Figure 4:
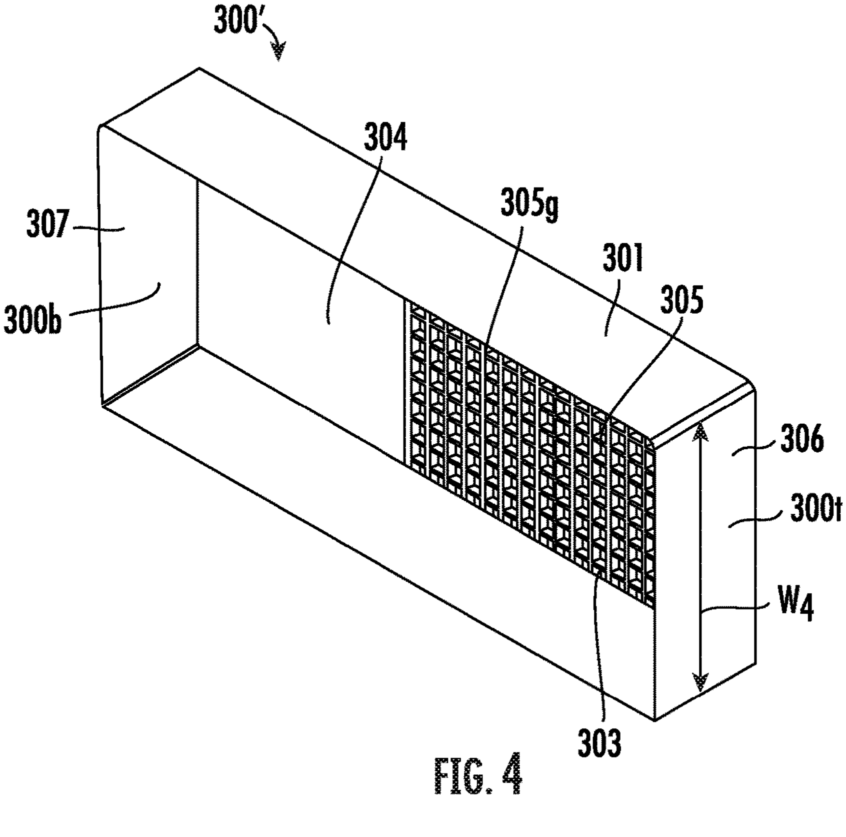
FIG. 4 is a rear, side perspective view of another example of a PIM shielding structure for a base station antenna according to embodiments of the present invention.

Referring to FIGS. 2-4, a PIM shielding structure 300 can be positioned between the rear wall 100*r* of the base station antenna housing 100*h* and a front 110*f* of the active antenna module 110. The front 110*f* of the active antenna module 110 defines a radome. The PIM shielding structure 300 can have a front 300*f* and right and left side walls 301. The front 300*f* comprises a first region 303 providing a frequency selective surface (FSS) 305.

The PIM shielding structure 300 can be provided as an external PIM shielding structure 300 that is at least partially, and entirely as shown, external to the base station antenna housing 100*h* and the active antenna module 110. The PIM shielding structure 300 can have rearwardly and longitudinally extending right and left side walls 301 with a front surface 303 extending therebetween. The PIM shielding structure 300 can abut a rear surface of the base station antenna housing 100*h* or be closely spaced apart therefrom, typically within 1-10 mm.

The front surface 303 can comprise a first region providing the frequency selective surface (FSS) 305. The FSS 305 can be provided with a grid pattern 305*g*. The front 303 can have a second region 304 that merges into and extends longitudinally away from the first region with the FSS 305. The second region 304 can be provided as an open space or closed surface between the right and left side walls 301. The second region 304 can extend longitudinally and laterally between the side walls 301. The second region 304 can have a different configuration from the first region and can comprise one or more of a full or partial metal surface, plastic, polymer, co-polymer or a flexible cover but is not required to have a FSS. Where the second region 304 is provided by a partial metal surface, it may be provided with a different grid pattern or no grid pattern.

The FSS 305 can be configured to allow high band radiating elements (typically located in the active antenna module 110) to propagate electromagnetic waves therethrough and to reflect lower band RF signals (lower band electromagnetic waves) from lower band radiating elements projecting forward of the FSS 305.

The reflector 170 of the base station antenna housing 100*h* can also have a FSS in front of the FSS 305 instead of the open space 170*s*. See, e.g., U.S. patent application Ser. No. 17/468,783 and U.S. Provisional Patent Application Ser. No. 63/236,727, for examples of reflector configurations, the contents of which are hereby incorporated by reference as if recited in full herein.

FIG. 3 illustrates that the PIM shielding structure 300 can have right and left side walls 301 but no laterally extending top or bottom walls 306, 307. Thus, the top and bottom 300*t*, 300*b* are open laterally between the longitudinally extending, rearwardly projecting, side walls 301 and the PIM shielding structure 300 can be configured as a "U" shape with the middle segment defining the front 300*f* and typically having a lateral extent that is greater than a width $W_1$ (measured in a front to back direction) of the side walls 301.

FIG. 4 illustrates that the PIM shielding structure 300 can have a rectangular box shape with top and bottoms 300*t*, 300*b*, each having a laterally extending wall 306, 307, respectively, behind the front 300*f*.

Figure 5A:
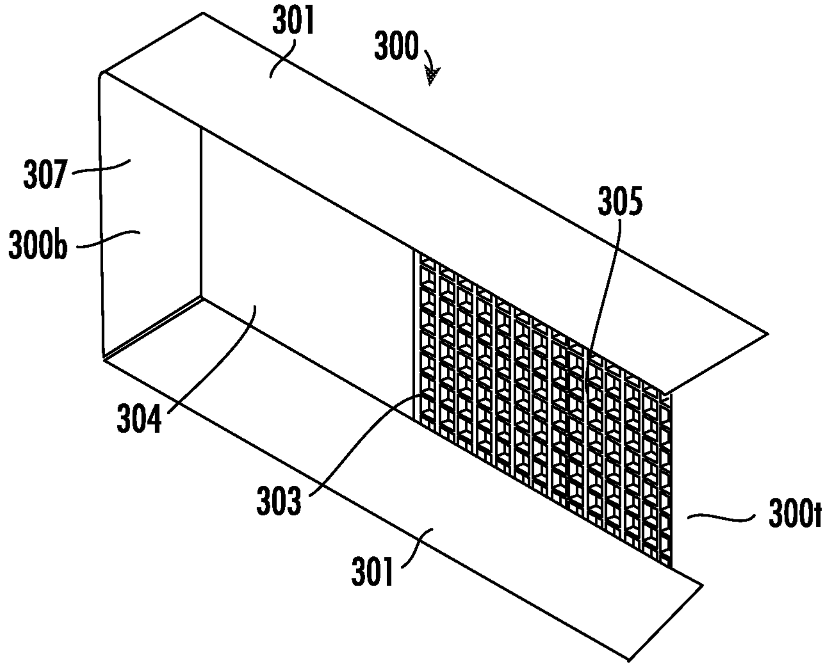
FIGS. 5A and 5B are rear, side perspective views of other embodiments of a PIM shielding structure for a base station antenna according to embodiments of the present invention.
Figure 5B:
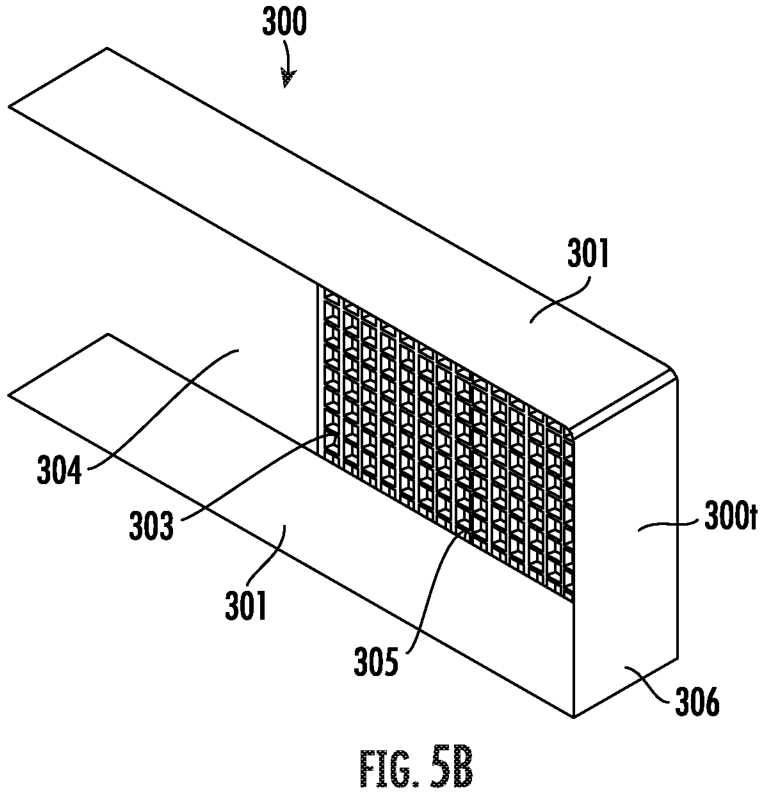

FIGS. 5A and 5B illustrate that the PIM shielding structure 300 can have a four-wall configuration. FIG. 5A illustrates a PIM shielding structure 300 with an open laterally extending top 300*t* between the two side walls 301, the front 300*f*, and with a bottom wall 307. FIG. 5B illustrates the PIM shielding structure with an open, laterally extending bottom 300*b* between the side walls 301 and with a top wall 306.

Figure 6:
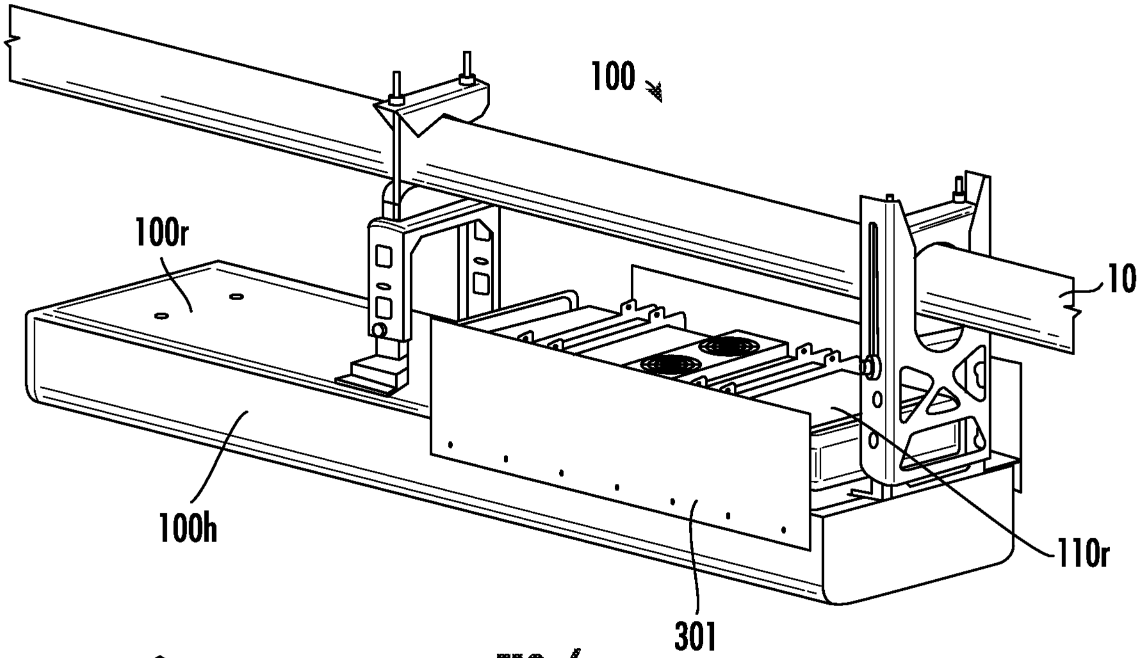
FIG. 6 is a back, side perspective view of yet another example PIM shielding structure coupled to a base station antenna according to embodiments of the present invention.

FIG. 6 illustrates that the side walls 301 can extend forward of the rear 100*r* of the base station antenna housing 100*h* and/or rearward of a rear 110*r* of the active antenna module 110.

Figure 7A:
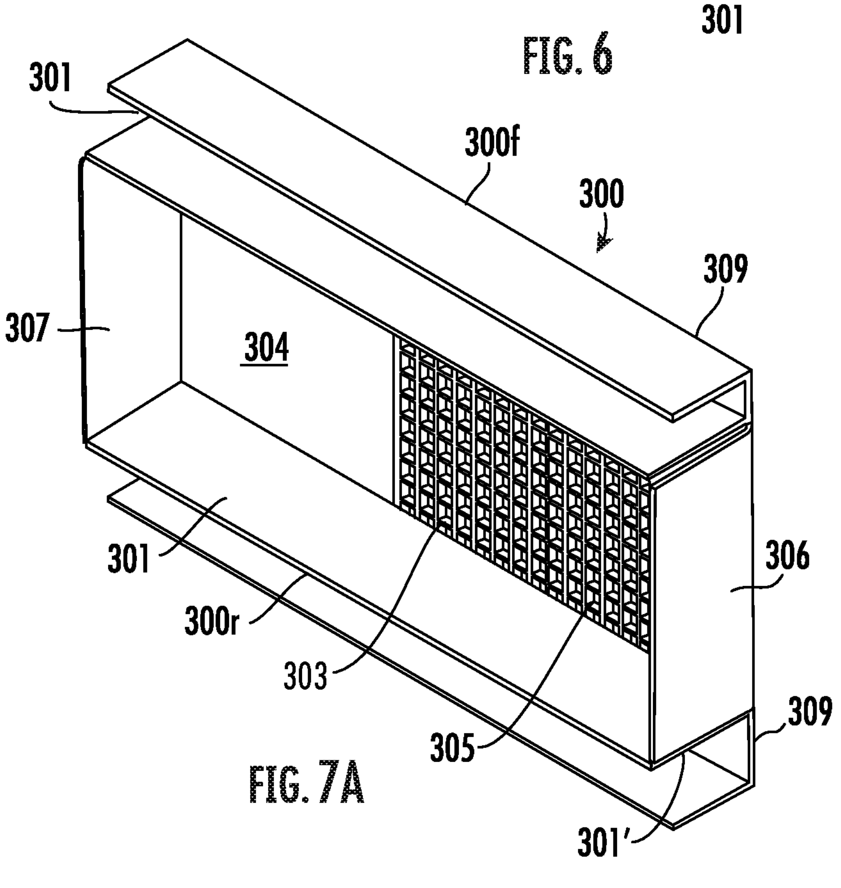
FIG. 7A is a rear, side perspective view of another embodiment of a PIM shielding structure according to embodiments of the present invention.
Figure 7B:
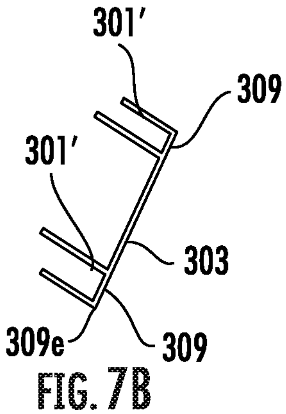
FIG. 7B is a lateral section view of the PIM shielding structure shown in FIG. 7A.

FIGS. 7A and 7B illustrate that the side walls 301' can be configured with a laterally extending segment 309, which extends from a front 300*f* of the PIM shielding structure 300 and may have an "L" shape, with an outer end 309*e* projecting rearward. This configuration can be configured as an RF choke or RF isolation fence. The term "RF choke" refers to a circuit element that is configured to block or "choke" currents in one or more defined frequency bands. See, co-pending U.S. Provisional Application Ser. No. 63/236,727, the contents of which are hereby incorporated by reference as if recited in full herein. The term "RF isolation fence" refers to a member that can block RF signals.

Figure 7C:
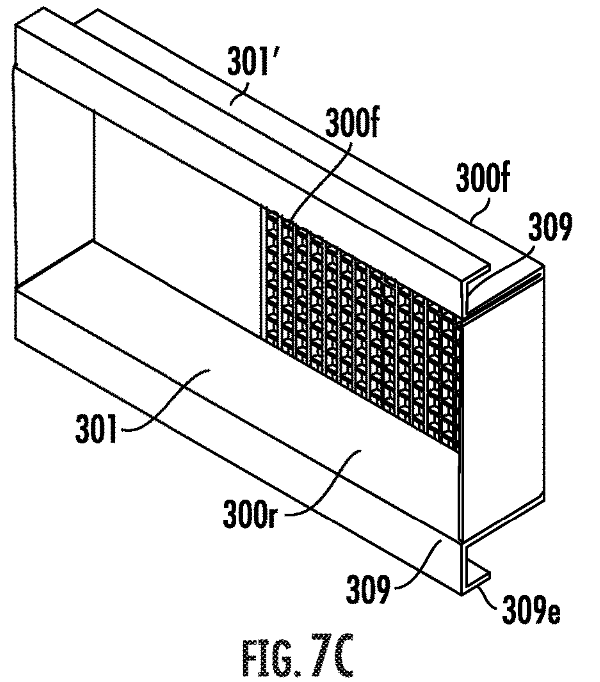
FIG. 7C is a rear, side perspective view of another embodiment of a PIM shielding structure according to embodiments of the present invention.
Figure 7D:
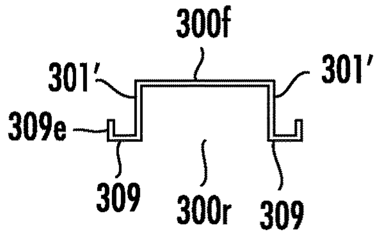
FIG. 7D is a lateral section view of the PIM shielding structure shown in FIG. 7C.

FIGS. 7C and 7D illustrate that the laterally extending segment 309 can extend from a rear or rear portion 300*r* of the PIM shielding structure 300 and can have an L shape with an L shaped body with a first segment/side of the L parallel to and electrically coupled or coupleable to an outer wall 110*w* (FIGS. 11, 12) of the active antenna module 110. The end portion 309 can extend laterally outward and optionally project forward as shown. The coupling can be provided by direct contact or capacitively via a dielectric (air or other dielectric) therebetween.

Figure 7E:
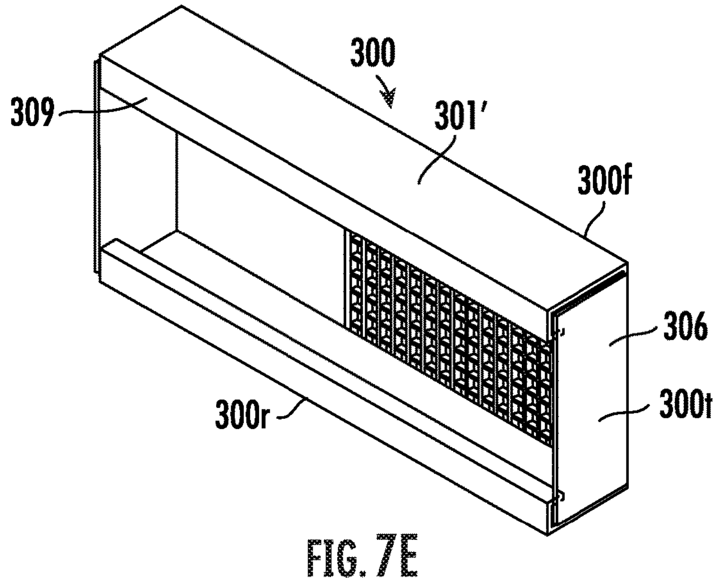
FIG. 7E is a rear, side perspective view of another embodiment of a PIM shielding structure according to embodiments of the present invention.
Figure 7F:
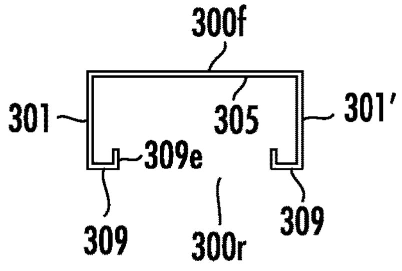
FIG. 7F is a lateral section view of the PIM shielding structure shown in FIG. 7E.

FIGS. 7E and 7F illustrate that the laterally extending segment 309 can extend from a rear or rear portion 300*r* of the PIM shielding structure 300 and can have an L shape with an L shaped body with a first segment/side of the L parallel to and electrically coupled (e.g., capacitively or galvanically) or couplable to an outer wall 110*w* (FIGS. 11, 12) of the active antenna module 110. The laterally extending segment 309 can extend laterally inward and have an end portion 309*e* that optionally projects forward as shown. The coupling can be provided by direct contact or capacitively via a dielectric (air or other dielectric) therebetween.

Referring again to FIG. 3, the right and left side walls 301 can have a width $W_1$ measured in a front-to-back direction that is at least the same, shown as greater, than a width $W_2$ of the sides 100*s*, 111*s* of the base station antenna housing 100*h*. The PIM shielding structure 300 can have a longitudinally extending length $L_1$ that is less than a longitudinally extending length $L_2$ of the base station antenna housing 100*h*. The length $L_1$ can correspond to a length of the active antenna module 110 or may be less or greater than the length of the active antenna module 110. The length $L_1$ can be greater than the length of the active antenna module 110 and may terminate closely spaced apart therefrom, such as within about 1-20 mm from corresponding top and bottom portions, in some embodiments. This may be particularly suitable where the bottom 300*b* of the PIM shielding structure 300 includes the laterally extending wall 307 (FIGS. 4, 5A, 7A) and/or where the top 300*t* includes the laterally extending wall 306.

The front 300*f* can have a laterally extending width $W_4$ that is the same or within +/−20% of the laterally extending width $W_3$ of the base station antenna housing 100*h*. In some embodiments, the laterally extending width $W_4$ of the front 300*f* of the PIM shielding structure is greater than that of the base station antenna 100*h* by about 1-30 mm.

The FSS 305 can be provided by any suitable material(s) such as, for example, a printed circuit board with a metal grid pattern, a non-metallic substrate comprising a metallized surface in a grid pattern 305*g* or a sheet or sheets of metal provided with a grid pattern 305*g*.

The FSS 305 can be configured to allow RF energy (electromagnetic waves) to pass through at one or more first defined frequency range and that is configured to reflect RF energy at a different second frequency band. Thus, the FSS 305 of the PIM shielding structure 300 can reside behind at least some antenna elements of the passive antenna assembly 190 and can selectively reject some frequency bands and permit other frequency bands such as those of the antenna elements 1190*e* of the active antenna 1190 to pass therethrough by including the frequency selective surface and/or substrate to operate as a type of "spatial filter".

A discussion of some example FSSs can be found in Ben A. Munk, Frequency Selective Surfaces: Theory and Design, ISBN: 978-0-471-37047-5; DOI: 10.1002/

0471723770; April 2000, Copyright © 2000 John Wiley & Sons, Inc., the contents of which are hereby incorporated by reference as if recited in full herein. See also, co-pending U.S. patent application Ser. No. 17/468,783, the contents of which are also incorporated by reference as if recited in full herein.

The FSS 305 can comprise, in some embodiments, metamaterial, a suitable RF material or even air (although air may require a more complex assembly). The term "metamaterial" refers to composite electromagnetic (EM) materials. Metamaterials may comprise sub-wavelength periodic microstructures.

The FSS 305 can be provided as one or more cooperating layers. In some embodiments, the FSS 305 can include a substrate that has a dielectric constant in a range of about 2-4, such as about 3.7 and a thickness of about 5 mil and metal patterns formed on the dielectric substrate. The thickness can vary but thinner materials can provide lower loss.

The FSS 305 can be behind and parallel to laterally extending segments of the right and left sides 170*r*, 170*l* of the reflector 170.

The right and left side walls 301 of the PIM shielding structure 300 can be electrically conductive and comprise metal, such as aluminum or aluminum alloy. The side walls 301 can be electronically coupled to one or more components in the active antenna module 110 and/or the reflector 170, such as galvanically or capacitively coupled thereto.

In some embodiments, the FSS 305 can be configured to act like a High Pass Filter essentially allowing mid band and/or low band energy <2.7 MHz, to substantially reflect (the FSS can act like a sheet of metal) while allowing higher band energy, for example, about 3.5 GHz or greater, to substantially pass through. Thus, the FSS 305 is transparent or invisible to the higher band energy and a suitable out of band rejection response from the FSS can be achieved. The FSS 305 may allow a reduction in filters or even eliminate filter requirements for looking back into the radio 1120.

In some embodiments, the FSS 305 may be implemented by forming the frequency selective surface on a printed circuit board, optionally a flex circuit board. In some embodiments, a multi-layer printed circuit board can comprise one or more layers which form the FSS 305 configured such that electromagnetic waves within a predetermined frequency range cannot propagate therethrough and with one or more other predetermined frequency range associated with the one or more layers of the multi-layer printed circuit board is allowed to pass therethrough. The grid pattern 305*g* can comprise shaped metal patches of any suitable geometry.

In some embodiments, the FSS 305 is provided by a sheet or sheets of metal that is/are stamped, punched, acid etched, or otherwise formed to provide a grid pattern 305*g*. The grid pattern 305*g* can be configured to have closed or open unit cells 1305 of any suitable geometry. The PIM shielding structure 300 can provide the front 300*f* and side walls 301 as a unitary monolithic shaped body of sheet metal.

Figure 13A:
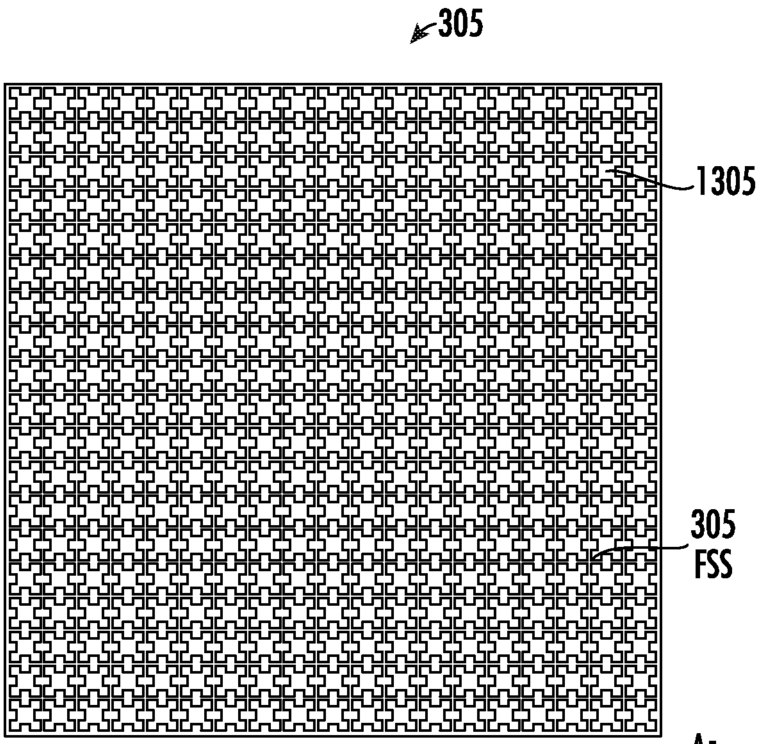
FIG. 13A is a front view of an example FSS grid for a PIM shielding structure for a base station antenna according to embodiments of the present invention.
Figure 13B:
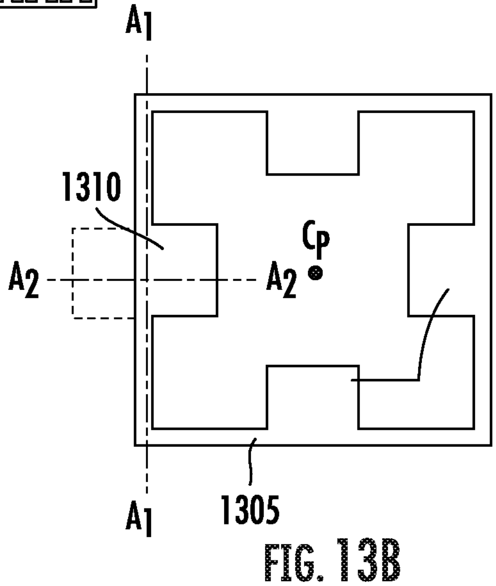
FIG. 13B is a greatly enlarged front view of a unit cell of the grid of the FSS shown in FIG. 13A.
Figure 13C:
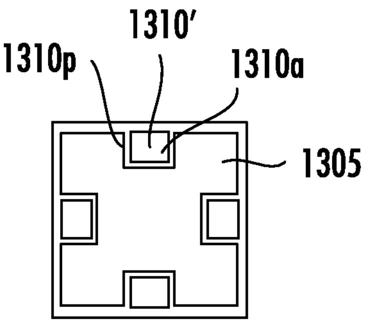
FIG. 13C is a greatly enlarged front view of another example of a unit cell of the grid of the FSS shown in FIG. 13A.

Referring to FIGS. 13A-13C, where used, the grid pattern 305*g* provided by the sheet(s) of metal can be provided with an array of unit cells 1305 with shaped metal patches 1310 (FIG. 13B) and/or open apertures 1310*a* devoid of metal surrounded by metal perimeters 1310*p* (FIG. 13C) that are configured to allow high band radiating elements to propagate electromagnetic waves and reflect low band signal from low band radiating elements projecting forward of the grid pattern 305*g*. The unit cells 1305 can have an axis of symmetry A-A about a center point Cp. Thus, in some embodiments, the FSS 305 is defined by/provided as a metal grid with an array of unit cells 1305. The unit cells 1305 can have an open center interior devoid of metal and each unit cell includes a metal perimeter. The FSS 305 can be provided as a single layer of sheet metal providing the grid pattern 305*g* with the unit cells and with the open centers or interiors devoid of metal. For further discussion of metal grids, see co-pending U.S. Provisional Application Ser. No. 63/254,446, the contents of which are hereby incorporated by reference as if recited in full herein.

Figure 13D:
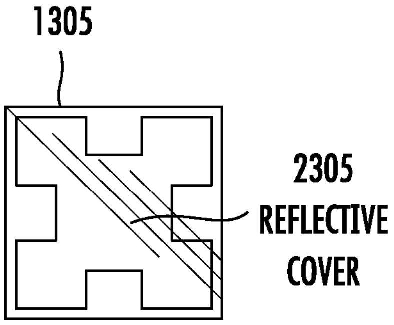
FIG. 13D is a greatly enlarged front view of another example of a unit cell of the grid of the FSS shown in FIG. 13A.

In some embodiments, the open centers Cp can be open to atmosphere/local environmental conditions. In other embodiments, the FSS 305 can comprise a dielectric cover 2305 extending over the unit cells 1305 as shown in FIG. 13D. The dielectric cover can comprise fiberglass, a printed circuit board, or a plastic, such as polymer or copolymer. The dielectric cover 2305 on metal grids 305*g* may improve low and/or mid band reflection. The dielectric cover 2305 may be attached to the FSS 305 to extend over (in front of and/or behind) each unit cell 1305.

Referring to FIG. 8A, in some embodiments, an active antenna module 110 can attach to the base station antenna 100 using a frame 112 and accessory mounting brackets 113, 114. The rear side 111*r* of the housing 100*h* may be a flat surface extending along a common plane over an entire longitudinal extent thereof or along at least a portion of the longitudinal extent thereof. The rear surface 100*r* can comprise a plurality of longitudinally spaced apart mounting structure brackets, shown as upper, medial, and lower brackets, 115, 116, 117, respectively, that extend rearwardly from the housing 100*h*. In some embodiments, the mounting structure brackets 115, 116, 117 may be configured to couple to one or more mounting structures 10 such as, for example, a tower, pole or building. At least two of the mounting structure brackets 115, 116 can also be configured to attach to the frame 112 of the base station antenna arrangement, where used. The frame 112 may extend over a sub-length of a longitudinal extent L of base station antenna 100, where the sub-length is shown in FIG. 3 as being at least a major portion thereof (at least 50% of a length thereof). The frame 112 can comprise a top 112*t*, a bottom 112*b* and two opposing long sides 112*s* that extend between the top 112*t* and the bottom 112*b*. The frame 112 can have an open center space 112*c* extending laterally between the sides 112*s* and longitudinally between the top 112*t* and bottom 112*b*.

The frame 112, where used, may be configured so that a variety of different active antenna modules 110 can be mounted to the frame 112 using appropriate accessory mounting brackets 113, 114. As such, a variety of active antenna modules 110 may be interchangeably attached to the same base station antenna 100. While the frame 112 is shown by way of example, other mounting systems may be used.

In some embodiments, a plurality of active antenna modules 110 may be concurrently attached to the same base station antenna 100 at different longitudinal locations using one or more frames 112. Such active antenna modules 110 may have different dimensions, for example, different lengths and/or different widths and/or different thicknesses.

Figure 8B:
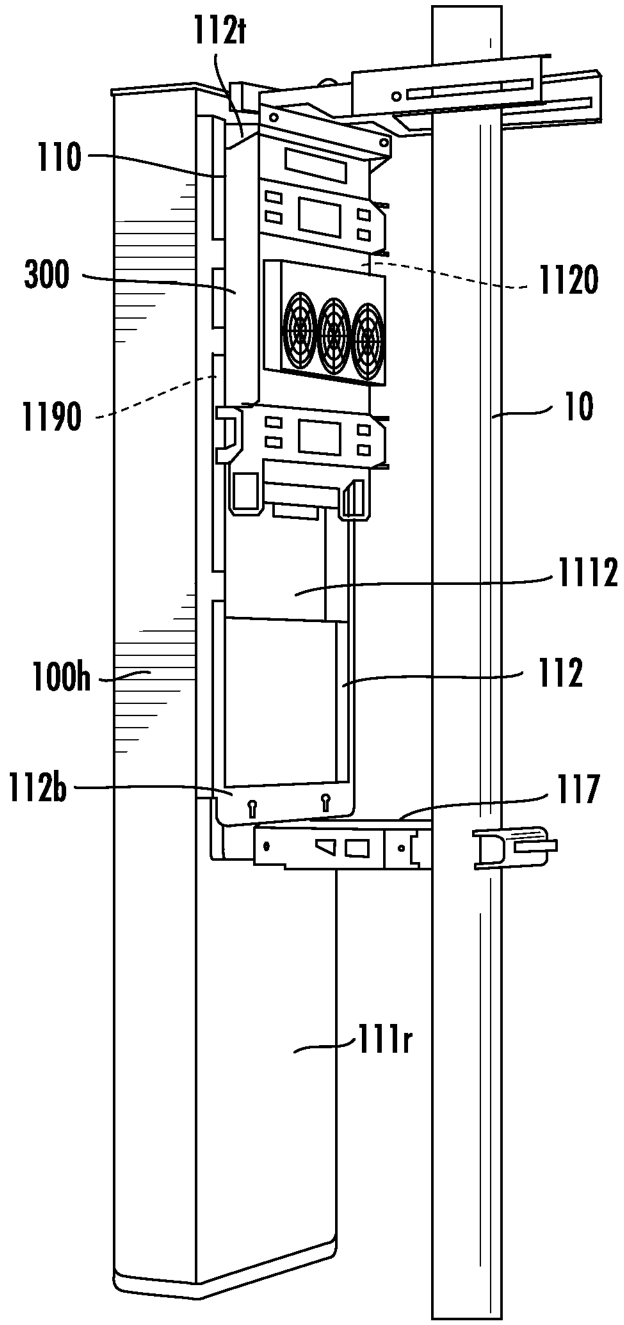
FIG. 8B is a rear perspective view of a base station antenna and active antenna module with a PIM shielding structure therebetween, similar to that shown in FIG. 8A and mounted to a target support structure (shown as a pole) according to embodiments of the present invention.

FIG. 8B illustrates a different configuration of an active antenna module 110 from that shown in FIG. 8A, with the PIM shielding structure 300 coupled to the base station antenna housing 100*h*. The mounting frame 112 can be coupled to an adapter plate 1112.

Figure 9:
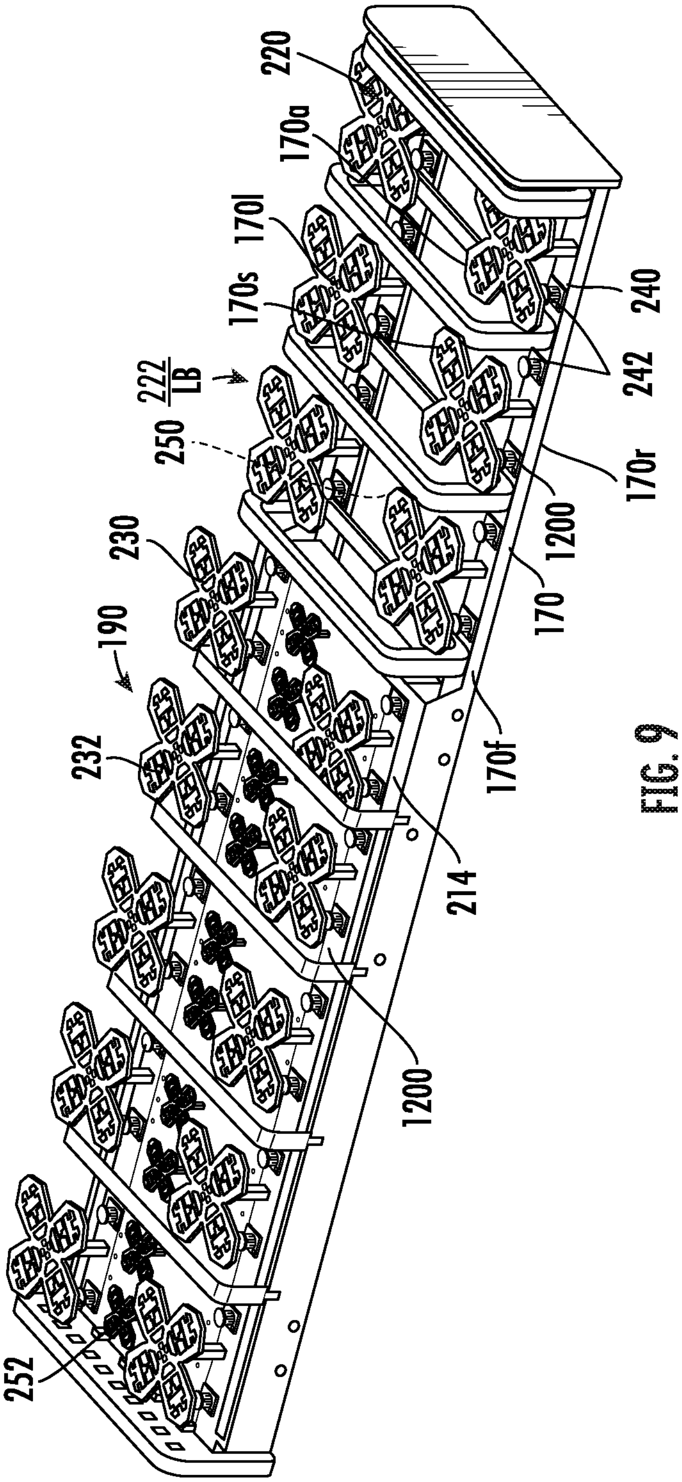
FIG. 9 is a front, side perspective view of a base station antenna with an example of a passive antenna assembly, shown with the radome transparent, according to embodiments of the present invention.

Turning now to FIG. 9, an example passive antenna assembly 190 is shown. The reflector 170 can have a first (shown as upper) portion 170*a* with the spaced apart right and left sides 170*r*, 170*l* and can merge into a primary reflector portion 214 that extends longitudinally and laterally. The primary reflector portion 214 may have a longitudinal length that is greater than a longitudinal length of the first portion 170. The primary reflector 214 can have a solid reflection surface for antenna elements residing in front of the primary reflector 214 and may reside over operational components 314, such as filters, tilt adjusters and the like. The primary reflector portion 214 can extend in front of and be co-planar with the first reflector portion 170*a*. The reflector 170 and the primary reflector 214 may comprise a single monolithic structure in some embodiments.

The first reflector portion 170*a* can reside a distance in a range of ⅛ wavelength to ¼ wavelength of an operating wavelength behind the low band dipoles 222, in some embodiments. The term “operating wavelength” refers to the wavelength corresponding to the center frequency of the operating frequency band of the radiating element, e.g., a low band radiating element 222. The first reflector portion 170*a* can reside a distance in a range of 1⁄10 wavelength to ½ wavelength of an operating wavelength in front of the high band radiating elements 1195 of the active antenna module 110 in some embodiments. By way of example, in some particular embodiments, the reflector portion 170*a* can reside a physical distance of 0.25 inches and 2 inches from a ground plane or reflector that is behind a mMIMO array of radiating elements 1195 of the active antenna 1190 of the active antenna module 110. Other placement positions may be used.

In some embodiments, the ground plane or reflector of the active antenna module 110 can be electrically coupled to the reflector portion 170*a* and/or primary reflector 214 of the base station antenna 100, such as galvanically and/or capacitively coupled. In other embodiments, the ground plane or reflector of the active antenna module 110 is not electrically coupled to the reflector portion 170*a* and/or primary reflector 214.

The antenna assembly 190 comprises multiple arrays of radiating elements, typically provided in columns, with radiating elements that extend forwardly from the primary reflector 214, with some columns of radiating elements continuing to extend in front of the front side 170*f* of the reflector 170. The arrays of radiating elements of the antenna assembly 190 may comprise radiating elements 222 that are configured to operate in a first frequency band and radiating elements 232 that are configured to operate in a second frequency band. Other arrays of radiating elements may comprise radiating elements that are configured to operate in either the second frequency band or in a third frequency band. The first, second and third frequency bands may be different frequency bands (although potentially overlapping). In some embodiments, low band radiating elements 222 that are configured to operate in some or all of the 617-960 MHz frequency band) can reside in front of and along right and left side portions 170*r*, 1701 of the reflector 170 and/or right and left sides of the primary reflector 214.

Some of the radiating elements of the antenna 100 may be mounted to extend forwardly from the primary reflector 214, and, if dipole-based radiating elements are used, the dipole radiators of these radiating elements may be mounted approximately ¼ of a wavelength of the operating frequency for each radiating element forwardly of the main reflector 214. The main reflector 214 may serve as a reflector and as a ground plane for the radiating elements of the base station antenna 100 that are mounted thereon.

Still referring to FIG. 9, the passive antenna assembly 190 of the base station antenna 100 can include one or more arrays 220 of low-band radiating elements 222, one or more arrays 230 of first mid-band radiating elements 232, one or more arrays of second mid-band radiating elements 242 and optionally one or more arrays 250 of high-band radiating elements 252. The radiating elements 222, 232, 242, 252, 1195 may each be dual-polarized radiating elements. Further details of radiating elements can be found in co-pending WO2019/236203 and WO2020/072880, the contents of which are hereby incorporated by reference as if recited in full herein. Some of the high band radiating elements, such as radiating elements 1195, can be provided as a mMIMO antenna array and may be provided in the active antenna module 110 rather than in the housing 100*h* of the base station antenna 100.

The low-band radiating elements 222 can be mounted to extend forwardly from the main or primary reflector 214 and the reflector portion 170*a* and can be mounted in two columns to form two linear arrays 220 of low-band radiating elements 222. Each low-band linear array 220 may extend along substantially the full length of the antenna 100 in some embodiments.

The low-band radiating elements 222 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.). The low-band linear arrays 220 may or may not be used to transmit and receive signals in the same portion of the first frequency band. For example, in one embodiment, the low-band radiating elements 222 in a first linear array 220 may be used to transmit and receive signals in the 700 MHz frequency band and the low-band radiating elements 222 in a second linear array 220 may be used to transmit and receive signals in the 800 MHz frequency band. In other embodiments, the low-band radiating elements 222 in both the first and second linear arrays may be used to transmit and receive signals in the 700 MHz (or 800 MHz) frequency band (e.g., to support 4xMIMO operation).

The first mid-band radiating elements 232 may likewise be mounted to extend forwardly from the main reflector 214 and/or reflector portion 170*a* and may be mounted in columns to form linear arrays 230 of first mid-band radiating elements 232. The linear arrays 230 of mid-band radiating elements 232 may extend along the respective side edges of the reflector 170 and/or the main reflector 214. The first mid-band radiating elements 232 may be configured to transmit and receive signals in a second frequency band. In some embodiments, the second frequency band may comprise the 1427-2690 MHz frequency range or a portion thereof (e.g., the 1710-2200 MHz frequency band, the 2300-2690 MHz frequency band, etc.). In the depicted embodiment, the first mid-band radiating elements 232 are configured to transmit and receive signals in the lower portion of the second frequency band (e.g., some or all of the 1427-2200 MHz frequency band). The linear arrays 230 of first mid-band radiating elements 232 may be configured to transmit and receive signals in the same portion of the second frequency band or in different portions of the second frequency band.

The second mid-band radiating elements 242 can be mounted in columns to form linear arrays 240 of second mid-band radiating elements 242. The second mid-band radiating elements 242 may be configured to transmit and receive signals in the second frequency band. In the depicted embodiment, the second mid-band radiating elements 242 are configured to transmit and receive signals in an upper portion of the second frequency band (e.g., some, or all, of the 2300-2700 MHz frequency band). In the depicted embodiment, the second mid-band radiating elements 242 may have a different design than the first mid-band radiating elements 232.

The high-band radiating elements 252 and/or 1195 can be mounted in columns in the upper medial or center portion of antenna 100 to form a multi-column (e.g., four or eight column) array 250 of high-band radiating elements 252 and/or 1195. The high-band radiating elements 1195 may be configured to transmit and receive signals in a third frequency band. In some embodiments, the third frequency band may comprise the 3300-4200 MHz frequency range or a portion thereof.

In the depicted embodiment, the arrays 220 of low-band radiating elements 222, the arrays 230 of first mid-band radiating elements 232, and the arrays 240 of second mid-band radiating elements 242 are all part of the passive antenna assembly 190, while the array 250 of high-band radiating elements 1195 are part of the active antenna module 110. It will be appreciated that the types of arrays included in the passive antenna assembly 190, and/or the active antenna module 110 may be varied in other embodiments.

It will also be appreciated that the number of linear arrays of low-band, mid-band and high-band radiating elements may be varied from what is shown in the figures. For example, the number of linear arrays of each type of radiating elements may be varied from what is shown, some types of linear arrays may be omitted and/or other types of arrays may be added, the number of radiating elements per array may be varied from what is shown, and/or the arrays may be arranged differently. As one specific example, two linear arrays 240 of second mid-band radiating elements 242 may be replaced with four linear arrays of ultra-high-band radiating elements that transmit and receive signals in a 5 GHz frequency band.

At least some of the low-band and mid-band radiating elements 222, 232, 242 may be mounted to extend forwardly of and/or from the reflector portion 170*a* or the primary/main reflector 214.

Each array 220 of low-band radiating elements 222 may be used to form a pair of antenna beams, namely an antenna beam for each of the two polarizations at which the dual-polarized radiating elements are designed to transmit and receive RF signals. Likewise, each array 232 of first mid-band radiating elements 232, and each array 242 of second mid-band radiating elements 242 may be configured to form a pair of antenna beams, namely an antenna beam for each of the two polarizations at which the dual-polarized radiating elements are designed to transmit and receive RF signals. Each linear array 220, 230, 240 may be configured to provide service to a sector of a base station. For example, each linear array 220, 230, 240 may be configured to provide coverage to approximately 120° in the azimuth plane so that the base station antenna 100 may act as a sector antenna for a three-sector base station. Of course, it will be appreciated that the linear arrays may be configured to provide coverage over different azimuth beamwidths. While all of the radiating elements 222, 232, 242, 252, 1195 can be dual-polarized radiating elements in the depicted embodiments, it will be appreciated that in other embodiments some or all of the dual-polarized radiating elements may be replaced with single-polarized radiating elements. It will also be appreciated that while the radiating elements are illustrated as dipole radiating elements in the depicted embodiment, other types of radiating elements such as, for example, patch radiating elements may be used in other embodiments.

Some or all of the radiating elements 222, 232, 242, 252, 1195 may be mounted on feed boards that couple RF signals to and from the individual radiating elements 222, 232, 242, 252, 1195, with one or more radiating elements 222, 232, 242, 252, 1195 mounted on each feed board. Cables (not shown) and/or connectors may be used to connect each feed board to other components of the antenna 100 such as diplexers, phase shifters, calibration boards or the like.

RF connectors or "ports" 140 (FIG. 8A) can be mounted in the bottom end cap 130 that are used to couple RF signals from external remote radio units (not shown) to the arrays 220, 230, 240 of the passive antenna assembly 190. Two RF ports can be provided for each array 220, 230, 240 namely a first RF port 140 that couples first polarization RF signals between the remote radio unit and the array 220, 230, 240 and a second RF port 140 that couples second polarization RF signals between the remote radio unit and the array 220, 230, 240. As the radiating elements 222, 232, 242 can be slant cross-dipole radiating elements, the first and second polarizations may be a −45° polarization and a +45° polarization.

A phase shifter may be connected to a respective one of the RF ports 140. The phase shifters may be implemented as, for example, wiper arc phase shifters such as the phase shifters disclosed in U.S. Pat. No. 7,907,096 to Timofeev, the disclosure of which is hereby incorporated herein in its entirety. A mechanical linkage may be coupled to a RET actuator (not shown). The RET actuator may apply a force to the mechanical linkage which in turn adjusts a moveable element on the phase shifter in order to electronically adjust the downtilt angles of antenna beams that are generated by the one or more of the low-band or mid-band linear arrays 220, 230, 240.

It should be noted that a multi-connector RF port (also referred to as a "cluster" connector) can be used as opposed to individual RF ports 140. Suitable cluster connectors are disclosed in U.S. patent application Ser. No. 16/375,530, filed Apr. 4, 2019, the entire content of which is incorporated herein by reference.

Referring to FIG. 9, feed boards 1200 can be provided in front of or behind the side segments of the primary reflector 214 and/or reflector portion 170*a*. The feed boards 1200 connect to feed stalks of radiating elements 222 (such as low band elements). The feed stalks can be angled feed stalks that project outwardly and laterally inward to position the front end of the feed stalks closer to center of the reflector 170 than a rearward end. The feed boards 1200 can be coupled and/or connected to the reflector portion 170*a* or to the primary reflector 214.

The radiating elements 220 can be dipole elements configured to operate in some or all the 617-960 MHz frequency band. Further discussions of example antenna elements including antenna elements comprising feed stalks can be found in U.S. Provisional Patent Application Ser. Nos. 63/087,451 and 62/993,925 and/or related utility patent applications claiming priority thereto, the contents of which are hereby incorporated by reference as if recited in full herein.

Some or all of the low or mid-band radiating elements 222, 232, respectively, may be mounted on the feed boards 1200 and can couple RF signals to and from the individual radiating elements 222, 232. Cables (not shown) and/or connectors may be used to connect each feed board to other components of the base station antenna 100 such as diplexers, phase shifters, calibration boards or the like.

Figure 10A:
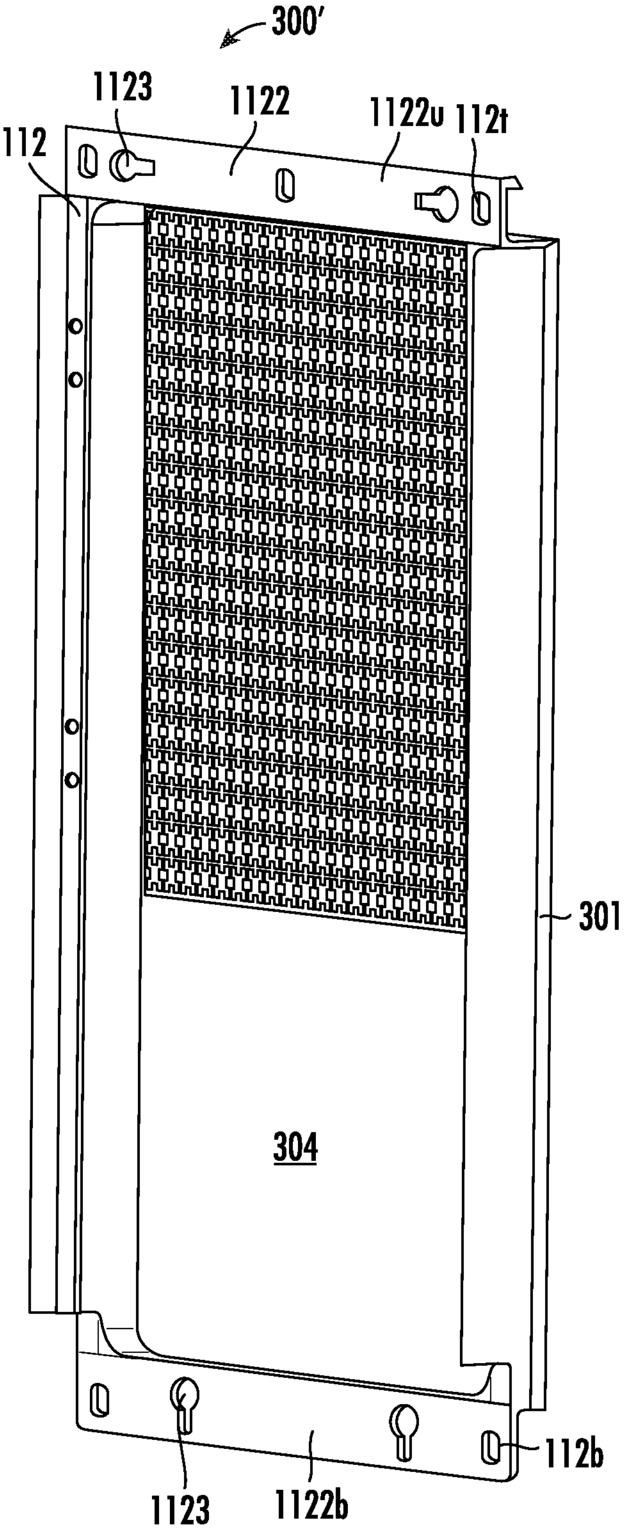
FIG. 10A is a rear, side perspective view of another embodiment of a PIM shielding structure according to embodiments of the present invention.
Figure 10B:
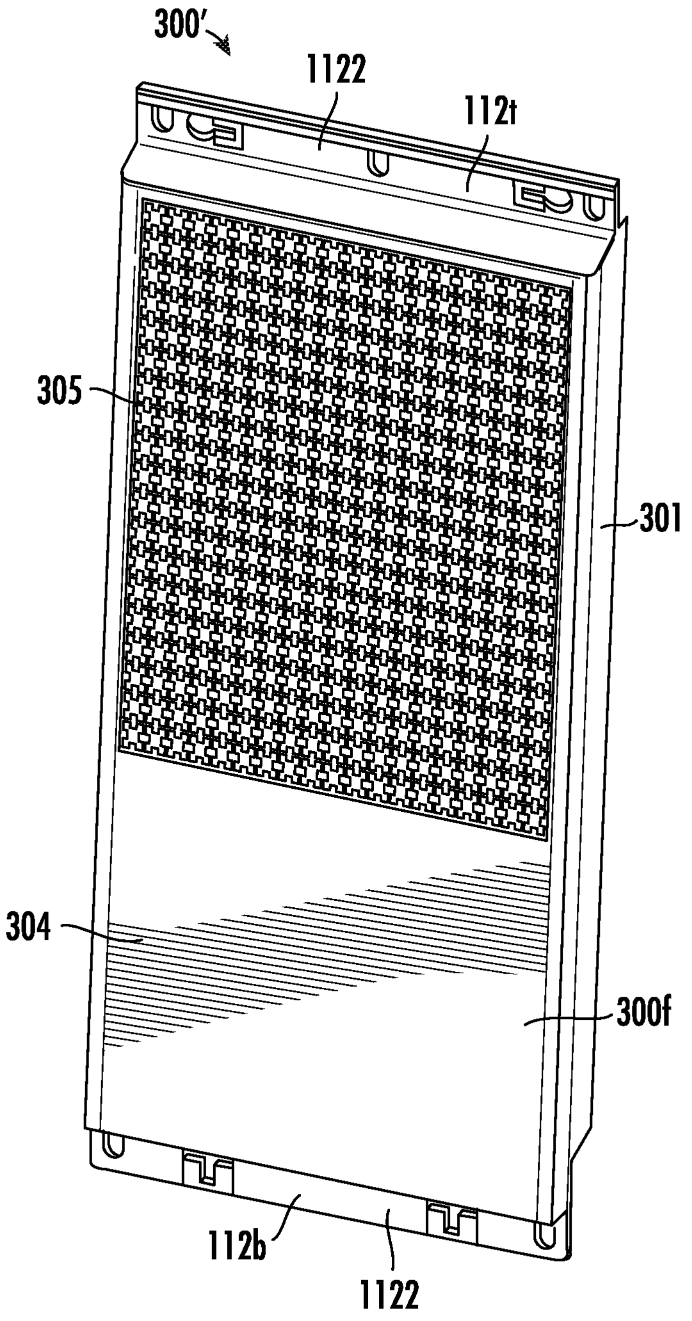
FIG. 10B is a front, side perspective view of the PIM shielding structure shown in FIG. 10A.
Figure 11:
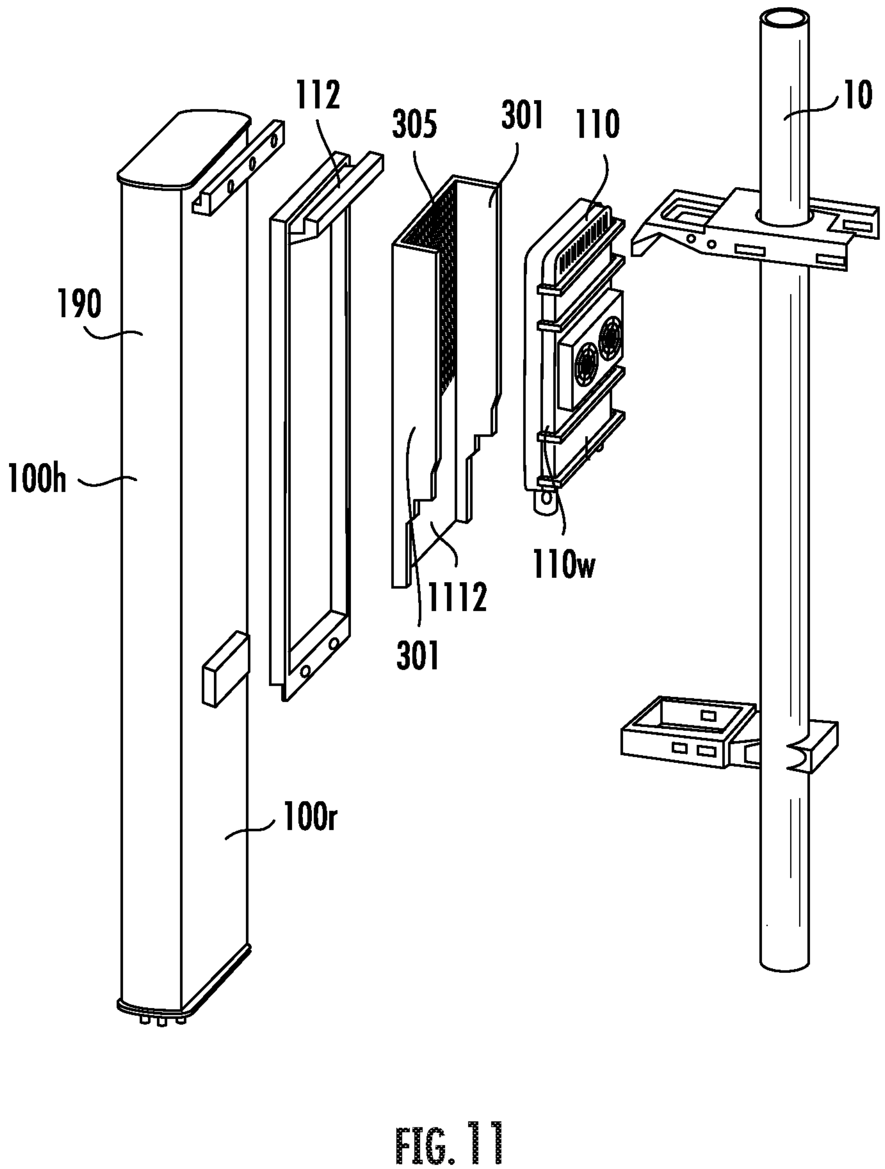
FIG. 11 is a side, partially exploded view of an example PIM shielding structure positioned between a base station antenna housing providing a passive antenna and an active antenna module or unit according to embodiments of the present invention.
Figure 12:
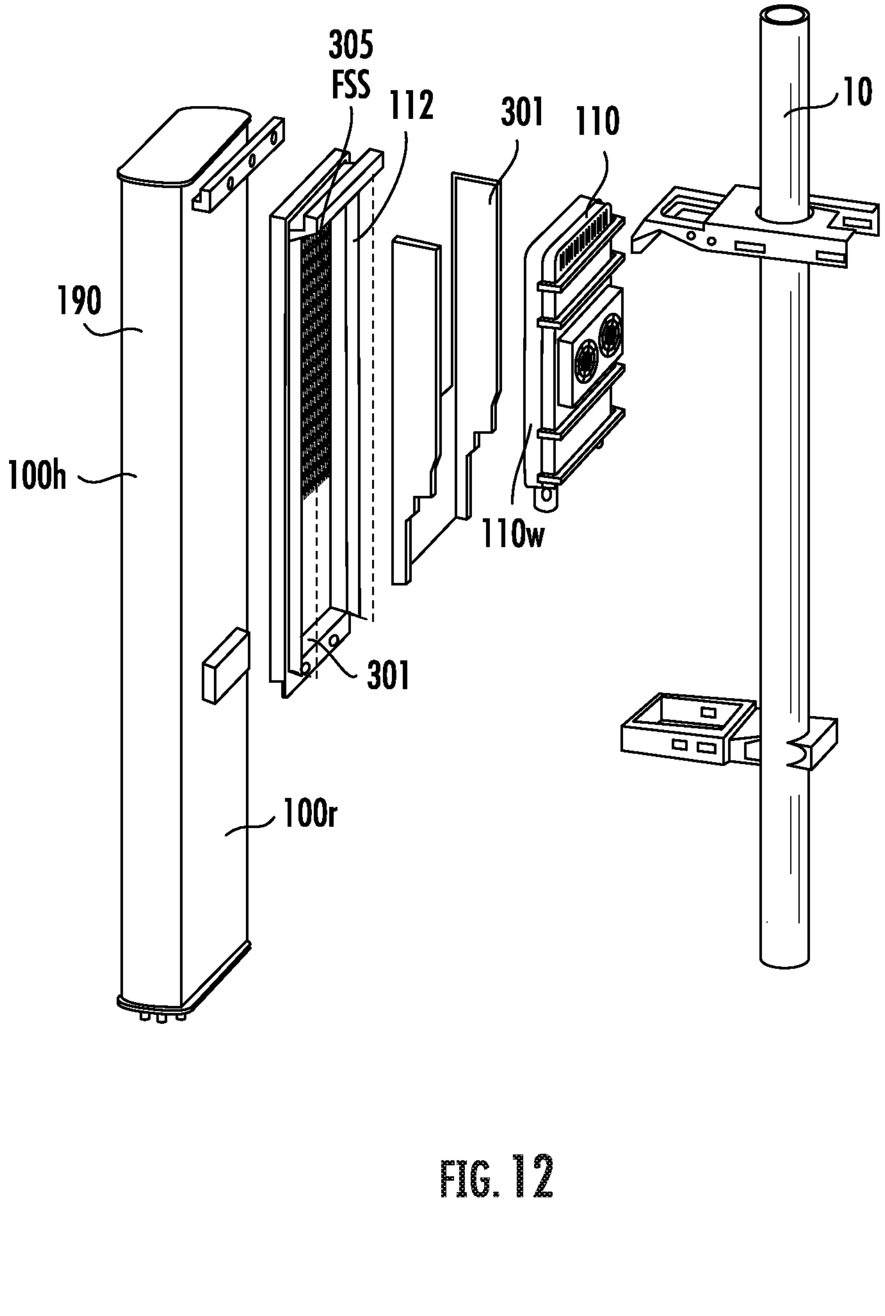
FIG. 12 is a side, partially exploded view of another example PIM shielding structure positioned between a base station antenna housing providing a passive antenna and an active antenna module or unit according to embodiments of the present invention.

Referring to FIGS. 10A and 10B, another embodiment of a PIM shielding structure 300' is shown. In this embodiment, the PIM shielding structure 300' can be integrated into a mounting member(s) such as the frame 112 and/or adapter plate 1112. As such, the PIM shielding structure 300' can comprise brackets 1122 at upper and lower portions 112*t*, 112*b* of the frame 112. The FSS 305 can be provided as part of the adapter plate 1112 (FIG. 11) or the frame 112 (FIG. 12). The side walls 301 can be provided by the frame 112 or the adapter plate 1112 (FIG. 11). The side walls 301 can define or cooperate with RF isolation fences, RF chokes and/or rails 210.

FIG. 10A illustrates that the PIM shielding structure 300' can be configured so that region 304 is an open window or space between the FSS 305 and lower bracket 1122*b*. FIG. 10B illustrates that the region 304 can be a continuous solid surface. The brackets 1122 can comprise slots 1123. The slots 1123 at the top bracket 1122*u* can be laterally oriented with larger segments facing laterally outward. The slots 1123 at the bottom bracket 1122*b* can be vertically oriented with a larger diameter on upper segments thereof. The slots 1123 cooperate with fixation members to affix the PIM shielding structure 300' to the base station antenna housing 100*h*.

The PIM shielding structure can allow a relatively compact structure to reduce and/or eliminate PIM while not providing increased wind loading or require additional spacing between the active antenna module 110 and the base station antenna housing 100*h*.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.)

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The term "about" used with respect to a number refers to a variation of +/−10%.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:

a base station antenna housing comprising a front radome and a rear;

a passive antenna assembly in the base station housing comprising plurality of linear arrays of radiating elements that extend in front of a reflector; and a passive inter-modulation distortion ("PIM") shielding structure that is at least partly positioned rearward of the base station antenna housing, wherein the PIM shielding structure comprises a frequency selective surface (FSS).

2. The base station antenna of claim 1, wherein the FSS is configured to reflect or block electromagnetic waves from radiating elements of the passive antenna assembly and allow higher band electromagnetic waves to travel therethrough toward the front radome.

3. The base station antenna of claim 1, wherein the FSS is external to the base station antenna housing.

4. The base station antenna of claim 1, wherein the PIM shielding structure comprises a longitudinally and laterally extending front that provides the FSS and right and left side walls that extend rearwardly behind the rear of the base station antenna housing.

5. The base station antenna of claim 4, wherein the right and left side walls have a width measured in a front to back direction that is greater than a width of side walls of the base station antenna housing.

6. The base station antenna of claim 1, further comprising an active antenna module coupled to the base station antenna housing with the FSS of the PIM shielding structure therebetween.

7. The base station antenna of claim 1, wherein the FSS is defined by at least one sheet of metal arranged to provide a grid pattern.

8. The base station antenna of claim 1, wherein the FSS comprises a grid pattern.

9. The base station antenna of claim 1, wherein the FSS extends across at least 50% of a lateral extent of the base station housing and extends along a sub-length of the PIM shielding structure.

10. The base station antenna of claim 9, wherein a front of the PIM shielding structure comprises an open space between the right and left side walls beneath the FSS.

11. The base station antenna of claim 1, wherein the PIM shielding structure is coupled to or defines a frame that is external to the base station antenna housing and that is coupled to the rear of the base station antenna.

12. The base station antenna of claim 1, further comprising an active antenna module coupled to the base station antenna housing with the PIM shielding structure external to the base station antenna housing and external to the active antenna module and rearward of at least a portion of sidewalls of the active antenna module, the sidewalls extending in a front-to-back direction, wherein the active antenna module comprises an array of radiating elements facing the FSS, and wherein the array of radiating elements of the active antenna module are configured to propagate RF energy through the FSS.

13. The base station antenna of claim 12, wherein the array of radiating elements of the active antenna module comprises a mMIMO array of radiating elements positioned behind the FSS.

14. The base station antenna of claim 12, wherein the FSS has a lateral extent that is a sub-distance of a lateral extent of the housing of the base station antenna and resides at an upper portion of the base station antenna housing, aligned with the array of radiating elements of the active antenna module.

15. The base station antenna of claim 12, wherein the active antenna module comprises a radome, and wherein the radome of the active antenna module resides adjacent to and faces the rear of the base station antenna housing with the FSS of the PIM shielding structure external to the base station antenna housing and external to the radome of the active antenna module and between the rear of the base station antenna housing and the radome of the active antenna module.

16. The base station antenna of claim 1, wherein the FSS is configured to allow RF energy to pass through at one or more defined frequency range and reflect RF energy at a different frequency band.

17. The base station antenna of claim 1, wherein the FSS is configured to reflect RF energy at a low band and pass RF energy at a higher band.

18. The base station antenna of claim 1, wherein the plurality of linear arrays comprise low band dipole antennas.

19. A base station antenna assembly comprising:

a plurality of columns of first radiating elements configured for operating in a first operational frequency band inside a base station antenna housing, each column of first radiating elements comprising a plurality of first radiating elements arranged in a longitudinal direction; and an external PIM shielding structure coupled to the base station antenna housing with right and left side walls extending rearwardly from the base station antenna housing and with a frequency selective surface (FSS) between the right and left side walls positioned with the FSS behind the plurality of columns of first radiating elements, wherein the FSS is configured to reflect electromagnetic waves within the first operational frequency band.

20. The base station antenna assembly of claim 19, further comprising a plurality of columns of second radiating elements configured for operating in a second operational frequency band that is different from and does not overlap with the first operational frequency band, each column of second radiating elements comprising a plurality of second radiating elements arranged in the longitudinal direction, wherein the FSS is further configured such that electromagnetic waves within the second operational frequency band can propagate through the FSS.

21. A PIM shielding structure for a base station antenna comprising:

a sheet metal body comprising a front that has a longitudinal extent and a lateral extent, wherein the front comprises a first region with a grid pattern comprising an array of unit cells defining a frequency selective surface, wherein the first region merges into a second region that is an open or closed longitudinally and laterally extending space, and wherein the sheet metal body comprises side walls that extend perpendicularly rearward of the front; and a frame coupled to the sheet metal body, wherein the frame comprises a top bracket with a plurality of laterally spaced apart slots configured to couple to a rear wall of a housing of a base station antenna.

* * * * *